United States Patent [19]
Onishi et al.

[11] Patent Number: 5,270,388
[45] Date of Patent: Dec. 14, 1993

[54] SHAPE-MEMORIZING BLOCK COPOLYMER COMPOSITION

[75] Inventors: Hidenori Onishi; Takao Morita, both of Yokohama, Japan

[73] Assignee: Nippon Zeon Co., Ltd., Tokyo, Japan

[21] Appl. No.: 691,797

[22] Filed: Apr. 26, 1991

[30] Foreign Application Priority Data

Apr. 27, 1990 [JP] Japan ................................. 2-110533

[51] Int. Cl.$^5$ ....................... C08L 53/02; C08F 236/04
[52] U.S. Cl. ......................................... 525/89; 525/48; 525/99; 525/232; 525/237; 526/340; 526/346; 526/347
[58] Field of Search ..................... 525/89, 99, 98, 232, 525/237; 526/340, 346, 347

[56] References Cited

U.S. PATENT DOCUMENTS

| | | | |
|---|---|---|---|
| 4,193,899 | 3/1980 | Brenner et al. | 524/572 |
| 4,945,127 | 7/1990 | Kagawa et al. | 525/197 |
| 5,043,396 | 8/1991 | Kitahara et al. | 525/377 |

FOREIGN PATENT DOCUMENTS

| | | |
|---|---|---|
| 0234512 | 2/1987 | European Pat. Off. . |
| 0366486 | 2/1990 | European Pat. Off. . |
| 60-223812 | 11/1985 | Japan . |

OTHER PUBLICATIONS

Asahi Chemical Ind. KK, "Low Draw Temperature Composition Contain Block Copolymer Contain Plastic Non Plastic Polymer Segment Polyvinyl Aromatic Hydrocarbon Conjugate Polydiene", Nov. 1985, JP-A-60 223 812.

Asahi Chemical Ind. KK, "Shape Memory Resinous Material Containing Crystal Block Copolymer Polystyrene Trans Butadiene Di Phenyl Carbonate", Jul. 1988, JP-A-63 179 955.

Asahi Chemical Ind. KK, "Heat Sensitive Shape Memory Resin Bumper Crystal Block Copolymer Aromatic Polyvinyl Compound Conjugate Diene Car", Jan. 1990, JP-A-2 022 355.

Primary Examiner—John Kight, III
Assistant Examiner—John M. Cooney, Jr.
Attorney, Agent, or Firm—Sherman and Shalloway

[57] ABSTRACT

A shape-memorizing block copolymer composition characterized by comprising a block copolymer component (I) composed of (A) at least two polymer segments (polymer segments A) having a glass transition temperature of 60° C. to 250° C. and (B) at least one amorphous polymer segment (polymer segment B) having a glass transition temperature which is not lower than −20° C. but lower than the lowest glass transition temperature within those of said polymer segments A with a difference not less than 20° C., the proportion of whole of said polymer segments A to whole of said polymer segment B being in the range of (10/90) to (70/30) by weight; and a rubbery polymer component (II) having a glass transition temperature lower than −20° C., the proportion of said component (I) to said component (II) being in the range of (50/50) to (98/2) by weight.

10 Claims, No Drawings

SHAPE-MEMORIZING BLOCK COPOLYMER COMPOSITION

This invention relates to a shape-memorizable block copolymer composition, and more specifically to a shape-memorizable block copolymer composition having excellent processability, flowability and impact resistance.

The shape-memorizable polymer memorizes a three-dimensional shape (a) given under a condition 1 and even when changed to a quite different shape (b) under another condition 2 restores the original shape (a) under a condition 3.

As a polymer having such a shape recovering property, there is known a triblock copolymer composed of one butadiene/styrene random copolymer block and two polystyrene blocks However, although this triblock copolymer has good shape memorizing property, there is still a problem to be solved in the uses requiring impact resistance.

The present inventors made investigations in order to solve the above problem and found that by blending a specified rubbery polymer having a certain glass transition temperature in a specified proportion, a shape memorizing block copolymer composition having excellent processability, flowability and impact resistance can be obtained without decrease of the shape-memorizing property. This finding led to the present invention.

According to the present invention, there is provided a shape-memorizing block copolymer composition characterized by comprising a block copolymer component (I) composed of (A) at least two polymer segments (polymer segments A) having a glass transition temperature of 60° C. to 250° C. and (B) at least one amorphous polymer segment (polymer segment B) having a glass transition temperature which is not lower than −20° C. but lower than the lowest glass transition temperature within those of said polymer segments A with a difference not less than 20° C., the proportion of whole of said polymer segments A to whole of said polymer segment B being in the range of (10/90) to (70/30) by weight; and a rubbery polymer component (II) having a glass transition temperature lower than −20° C., the proportion of said component (I) to said component (II) being in the range of (50/50) to (98/2) by weight.

According to this invention, there is provided also a method of using the shape-memorizing block copolymer composition by molding the shape-memorizing copolymer composition at a temperature higher than the highest glass transition temperature of each polymer segment A to memorize the shape at the time of molding, deforming the molded block copolymer composition into any desired shape at a temperature below the lowest of the glass transition temperature of each polymer segment A of the block copolymer components (I), cooling it to a temperature below the lowest of the glass transition temperature of each polymer segment B of the block copolymer components (I) to thereby fix the deformation, heating the deformation-fixed block copolymer composition to a temperature which is below the lowest glass transition temperature of the polymer segment A of the copolymer component (1) and which exceeds the lowest glass transition temperature of each polymer segment B of the block copolymer component to thereby release the fixation of deformation, and reviving the shape memorized at the time of molding.

According to the present invention, there is further provided a shape-memorized product obtained by molding the shape-memorizable block-copolymer composition at a temperature above the highest glass transition temperature of each polymer segment A of the block copolymer component (I) constituting the shape-memorizing block copolymer composition.

The polymer segment A of the block copolymer component (I) constituting the inventive shape-memorizing block copolymer composition has a glass transition temperature of 60° C. to 250° C., preferably 80° C. to 200° C. If the glass transition temperature of the polymer segment A is lower than 60° C., the temperature for using the resultant shape-memorizing block-copolymer composition is excessively low. If, on the other hand, it exceeds 250° C., the molding temperature becomes too high and is not preferred.

There is no particular limitation on the monomers used for the synthesis of polymer segment A Specific examples include aromatic vinyl monomers such as styrene, methylstyrene, vinyltoluene, vinylnaphthalene, isopropenyl naphthalene, conjugated diene monomers such as butadiene, isoprene, piperylene, phenylbutadiene and 1,4-diphenyl-butadiene; acrylate monomers such as methyl acrylate, ethyl acrylate and glycidyl acrylate; vinyl ethers such as methylvinyl ether; and isobutylene vinylpyridine, isopropenylpyridine, and isopropenylquinoline. These monomers may be used singly or as a mixture of two or more.

Preferably, the polymer segment A used in this invention should preferably contain aromatic vinyl monomer units, and more preferably should be a homopolymer or copolymer of an aromatic vinyl monomer or a copolymer of an aromatic vinyl monomer and a conjugated diene monomer containing at least 50% of an aromatic vinyl monomer unit.

The polymer segment A has a weight average molecular weight calculated on polystyrene of 5,000 to 300,000, preferably 10,000 to 200,000.

The amorphous polymer segment B used in this invention should have a glass transition temperature of at lowest −20° C. and lower than the lowest glass transition temperature of the polymer segments A with a difference of at least 20° C. Preferably it has a glass transition temperature of 0° C. to 60° C. If the glass transition temperature of the polymer segment B is lower than −20° C., the use temperature of the shape-memorizing block copolymer composition is excessively low. If the difference between the lowest glass transition temperature within the polymer segments A and the glass transition temperature of the polymer segments B does not reach 20° C., the shape-recovering property decreases. When the polymer segment B is not amorphous, the shape recovering rate of the shape-memorizing block copolymer composition becomes unpreferably low.

In the present invention, the monomers used for the synthesis of the polymer segment B are not particularly limited. Specific examples may be those used for the synthesis of the polymer segment A, shown in the above.

The polymer segments B used in the present invention are specifically exemplified by amorphous homopolymers or copolymers of a conjugated diene monomer, or an amorphous copolymer of a conjugated diene monomer and an aromatic vinyl monomer having at lowest −20° C. of the glass transition temperature as the preferred examples and, more preferably, should be a random copolymer of a conjugated diene monomer and an aromatic vinyl monomer, in particular. The units of conjugated diene monomer and the units of aromatic vinyl monomer should be contained preferably in a ratio of 70/30 to 5/95 by weight, in particular.

If the proportion of the conjugated diene monomer units in these polymers is lower than 5% by weight, the impact resistance of the resultant polymer deteriorates. On the other hand, if it exceeds 70% by weight, the use temperature of the shape-memorizing resin of the resultant block copolymer becomes too low.

The polymer segment B has a molecular weight of 10,000 to 300,000, preferably 20,000 to 200,000.

In the block copolymer component (I) of this invention, the weight ratio of the polymer segment A to the polymer segment B should be 90/90 to 70/30, preferably 20/80 to 50/50. If the proportion of the polymer segment A is less than 10% by weight, the properties of the shape-memorizing block copolymer composition are reduced. If the proportion of the polymer segment A exceeds 70% by weight, the composition becomes brittle and has inferior impact resistance.

The weight average molecular weight of the inventive block copolymer component (I) as converted to that of the standard polystyrene should be 50,000 to 800,000, usually, or 100,000 to 500,000 preferably. The molecular weight less than 50,000 induces deterioration of the mechanical character of the block copolymer and the moldability of the block copolymer lowers by that exceeding 800,000.

The structure of the inventive block copolymer component (I) is not restrictive in particular with a proviso of satisfying the above condition and may be exemplified by those having a structure represented by the general formula $(A-B)_lA$, $(A-B)_m$ or $(A-B)_nX$, wherein A represents the above-mentioned polymer segment A, B represents the above-mentioned polymer segment B, l represents an integer from 1 to 5, m represents an integer from 2 to 5, n represents an integer from 2 to 10 and X represents a residual group of a difunctional to ten-fold functional coupling agent. Furthermore, it may also be a structure including polymer chains of a single or plural number containing the polymer segment A and the polymer segment B as the branching groups on the plural number of sites in the main chains containing the polymer segment A and/or the polymer segment B.

There is no particular limitation in the difunctional to 10-functional coupling agent used in the synthesis of the block copolymer component (I) of the invention. Examples include phenyl acetate, ethyl benzoate, dichlorosilane, dimethyldichlorosilane, dimethyldibromotin, methyltrichlorosilane, phenyltrichlorosilane, methylbromosilane, silicon tetrachloride, tetramethoxysilane, tin tetrachloride, (dichloromethyl)trichlorosilane, (dichlorophenyl)trichlorosilane, hexachlorodisilane, hexachlorodisiloxane, 1,2,3,4,7,7-hexachloro-6-methyldichlorosilyl-2-norbornene, octachlorotrisiloxane and divinylbenzene.

There is no limitation to the method of synthesizing the block copolymer component (I) of the invention, and a conventional method (such as the living anion polymerization, group-transfer polymerization and the living cation polymerization) may be used.

The synthesizing methods include as the specific examples a method successively synthesizing the polymer segment A and the polymer segment B in a alternating order using a monofunctional living polymerization initiator; a method of synthesizing a polymer block consisting of a polymer segment A and a polymer segment B followed by coupling of the same at the site of the polymer segment B; and a method of synthesizing a polymer segment B using a difunctional living polymerization initiator followed by synthesis of the polymer segments A adjacently to the both terminals of the same. Lithium type polymerization initiators are alkali metal alkyl compound, preferably used in these living polymerization reactions in view of the easiness in production, though not particularly restrictive.

The rubbery polymer component (II) used in the present invention may be selected from those prepared by the conventional emulsion polymerization methods or solution polymerization methods without restriction with provisos that the glass transition temperature thereof is lower than $-20°$ C. and mechanical kneading thereof jointly with the block copolymer component (I) is possible.

Specific examples thereof include conjugated diene polymers, rubbery polymers of a conjugated diene compound and an aromatic vinyl compound, rubbery polymers of a conjugated diene compound and a monomer copolymerizable therewith (excluding aromatic vinyl compounds), and rubbery polymers of an unsaturated carboxylic acid and an unsaturated carboxylic acid ester. Examples of the conjugated diene polymer are polybutadiene rubber, polyisoprene rubber, poly-2,3-dimethyl-butadiene, poly-1,3-pentadiene and polychloroprene rubber. Examples of the rubbery polymer of the conjugated diene compound and the aromatic vinyl compound include styrene-butadiene rubber, styrene-butadiene block copolymer rubber, styrene-isoprene block copolymer rubber, poly($\alpha$-methyl styrene/butadiene) copolymer, and poly(vinyltoluene/butadiene) copolymer. Examples of the rubbery polymer of the conjugated diene compound and a monomer copolymerizable with it (excluding aromatic vinyl compounds) include acrylonitrile-butadiene rubber. Examples of the rubbery copolymer of the conjugated diene and a monomer copolymerizable with it include acrylonitrile-butadiene rubber. Example of the rubbery copolymer of the unsaturated acid and the unsaturated carboxylic acid ester include acrylic rubbers. There may further be used other rubbers such as silicone rubber and epichlorohydrin-type rubber or natural rubbers.

Rubbery polymers composed of an aromatic vinyl monomer and a conjugated diene are preferred in particular among these rubbery polymers with further preference to the rubbery block copolymers. Further, the rubbery block copolymers may have two or more of the glass transition temperatures but the lowest thereof should preferably be lower than $-20°$ C.

The weight ratio of the block copolymer component (I) to the rubbery polymer component (II) constituting the shape-memorizable block copolymer composition is (50/50) to (98/2) or, preferably, (60/40) to (95/5).

The ratio of the rubbery polymer component exceeding 50% by weight is not preferable because of deterioration of the characteristic of the composition for shape-memorizing. Also, the ratio lower than 2% by weight induces difficulty in applications to the uses in which impact resistance is required in particular.

The inventive shape-memorizable block copolymer compositions may be added with a softening agent, a plasticizer, an antioxidant, a heat-stabilizer, an ultraviolet absorbing agent, a filler or any of other additives within the range not impairing the effect of the present invention.

The softening agent may be used by being selected from those known in the prior art as useful for polymeric resin materials. They are exemplified by extender oils of the aromatic type, the paraffinic type or the naphthenic type and liquid polymers such as polybutene, polyisobutylene and the like.

The plasticizer to be used may be selected from those known in the prior art as exemplified by those of the phthalic acid type such as dibutyl phthalate, dioctyl phthalate, di-(2-ethylhexyl) phthalate and the like, those of the phosphoric acid type such as tricresyl phosphate and the like, in addition, of the fatty acid type, of the epoxy type, and so forth.

The antioxidant to be used may be selected from the hindered phenol type compounds such as 2,6-di-tert-butyl-p-cresol, di-tert-butyl-4-methyl phenol and the like, thiodicarboxylate esters such as dilauryl thiopropionate and the like, furthermore, phosphite salts such as tris(nonyl phenyl) phosphite and the like, and so forth and they may be used either solely or as a mixture.

The filler may be exemplified by titanium oxide, calcium carbonate, clay, talc, mica, bentonite, silica, carbon and the like.

The inventive shape-memorizable shaped articles are obtained by subjecting the inventive shape-memorizable block copolymer composition to molding by any of the methods known in the prior art such as the extrusion molding, the injection molding, the compression molding and the like at temperatures higher than the highest glass transition temperature within those of the polymer segments A. There is no restriction on the figure of the molded products in particular.

Thus, the present invention can provide a shape-memorizable block copolymer composition which is excellent in the processability, the flowability and the impact resistance. Such block copolymer compositions can memorize the initial shape which may be restored according to the requirement from any of optional figures which have been produced by deformation after the above memorizing and fixed.

The inventive shape-memorizable block copolymer compositions with excellent impact resistance may be obtained as molded products of various shapes with a memory of the desired shape by any of the various molding methods. These molded products may be used in the shape restored at the site of requirement after being assembled in a deformed figure by which easiness in handling is obtained and transported in the cases in which difficulty in assembling or transportation is brought about by the initial shape. The shape-memorizable block copolymer compositions and the shape-memorizable molded products of the present invention are capable of being used in a wide scope of fields such as various industrial supplies, therapeutic articles, ornaments, toys or the like as the application of such a characteristic.

The present invention is explained more specifically in the following referring to the examples. The terms part(s) or % appearing in the examples and comparative examples are on the basis of weight unless otherwise noted.

Each of the molecular weights of polymers is a weight average molecular weight as a conversion to that of the standard polystyrene and was determined by gel permeation chromatography using tetrahydrofuran as the solvent.

EXAMPLES 1 TO 4 AND COMPARATIVE EXAMPLES 1 TO 3

Three kinds of block copolymers (polymer a to Polymer c) listed in Table 1 were prepared by polymerization using n-butyl lithium as the polymerization initiator to be used as the block copolymer component (I).

Polymer a is a block copolymer obtained by the sequential procedures including synthesis of polymer segment A by the polymerization of Monomer I, synthesis of polymer segment B by the continued polymerization with Monomer Mixture II introduced in the polymerization system and the final step of the coupling reaction using a coupling agent.

Polymer b and Polymer c are each a triblock copolymer obtained by the sequential procedures including synthesis of the polymer segment A by the polymerization of Monomer I, synthesis of the polymer segment B by the introduction of Monomer Mixture II into the polymerization system and the recurrent synthesis of the polymer segment A by the continued polymerization with Monomer III introduced into the polymerization system.

Each of Polymer a, Polymer b and Polymer c as the block copolymer component (I) was subjected to kneading jointly with any one of the following rubbery polymer components (II), ① styrene-butadiene copolymer rubber
(SBR; glass transition temperature $-84°$ C. produced by Asahi Kasei Kogyo K.K.),
② styrene-butadiene block copolymer
(SBS; glass transition temperature $-81°$ C., produced by Asahi Kasei Kogyo K.K.),
③ styrene-isoprene block copolymer
(SIS; glass transition temperature $-72°$ C., produced by Nippon Zeon K.K.) or
④ polyisoprene rubber
(IR; glass transition temperature $-73°$ C., produced by Nippon Zeon K.K.)

in a formulation shown in Table 2 using a roll mill heated to 150° C. to be prepared in a sheet form. These sheets were subjected to determination of the shape recovering factor and the impact resistance.

The prepared sheets were given with 100% elongation at 50° C. followed by cooling to 15° C. to fix the deformation and then heated again to 50° C. to restore the initial figures.

The shape recovering factor is calculated by the equation $$\text{shape recovering factor} = \{\text{deformation at 100\% elongation } (L_1) - \text{deformation after shape recovery } (L_2)\}/\text{initial length } (L_0) \times 100(\%).$$

Determination of the impact resistance was carried out according to JIS K 7110 (Izod Impact Test method).

Results are shown in Table 2.

From the results in Table 2, it can be understood that the inventive shape memorizable block copolymer compositions exhibit favorableness in the shape memorizing property, the processability and the impact resistance.

TABLE 1

|  |  | Polymer a | Polymer b | Polymer c |
|---|---|---|---|---|
| Monomer I (g) | styrene | 420 | 210 | 210 |
| Monomer II (g) | styrene | 686 | 686 | 392 |
|  | 1,3-butadiene | 294 | 294 |  |
|  | isoprene |  |  | 588 |
| Monomer III (g) | styrene |  | 210 | 210 |
| Coupling agent (millimoles) | dichlorodiphenyl silane | 8.2 |  |  |
| Weight ratio (polymer segments A/polymer segment B) |  | 30/70 | 30/70 | 30/70 |
| Glass transition temperature of polymer segments A (°C.) |  | 100 | 100 | 100 |
| Weight average molecular weight of polymer segments A × $10^{-4}$ |  | 3.1 | 3.0 | 3.1 |
| Glass transition temperature of polymer segment B (°C.) |  | 31.0 | 32.5 | 28.1 |
| Weight average molecular weight of polymer segment B × $10^{-4}$ |  | 12.2 | 13.5 | 12.1 |
| Weight average molecular weight of the block copolymer × $10^{-4}$ |  | 18.7 | 19.1 | 18.5 |
| Melt flow index (g/10 minutes) |  | 3.6 | 3.2 | 2.9 |

TABLE 2

|  |  | Comparative Example | | | Example | | | |
|---|---|---|---|---|---|---|---|---|
|  |  | 1 | 2 | 3 | 1 | 2 | 3 | 4 |
| Block Copolymer Component (I) | polymer a | 100 |  |  | 100 |  |  |  |
|  | polymer b |  | 100 |  |  | 100 |  |  |
|  | polymer c |  |  | 100 |  |  | 100 | 100 |
| Rubbery Polymer Component (II) | ① SBR |  |  |  | 15 |  |  |  |
|  | ② SBS |  |  |  |  | 15 |  |  |
|  | ③ SIS |  |  |  |  |  | 20 |  |
|  | ④ IR |  |  |  |  |  |  | 10 |
| Izod impact strength (kg · cm/cm²) |  | 2.0 | 2.1 | 2.8 | 3.9 | 4.5 | 5.1 | 4.2 |
| Shape recovery (%) |  | 97 | 98 | 96 | 92 | 94 | 96 | 93 | transition temperature −81° C., produced by Asahi Kasei Kogyo K.K.) or

③ styrene-butadiene diblock copolymer (SBS-1; styrene/butadiene=22/78 by weight, glass transition temperature −85° C.: and SBS-2; styrene/butadiene=35/65 by weight, glass transition temperature −94° C.)

in a formulation shown in Table 3. These sheets were subjected to determination of the shape recovering factor and Dynstat Impact Strength applying DIN 53453.

Results are shown in Table 3.

TABLE 3

|  | Comparative Example | Example | | | | | |
|---|---|---|---|---|---|---|---|
|  | 4 | 5 | 6 | 7 | 8 | 9 | 10 |
| Block copolymer Component (I) | 100 | 100 | 100 | 100 | 100 | 100 | 100 |
| Rubbery polymer component (II) ① BR |  | 10 | 20 | 30 |  |  |  |
| ② SBS-1 |  |  |  |  | 30 |  |  |
| ② SBS-2 |  |  |  |  |  | 30 | 30 |
| ③ SB-1 |  |  |  |  |  |  | 5 |
| ③ SB-2 |  |  |  |  |  |  | 5 |
| Dynstat impact strength (kg · cm/cm) | 1.97 | 6.55 | 9.92 | 9.30 | 20.44 | 21.75 | 18.16 |
| Shape recovery (%) | 98 | 96 | 95 | 94 | 94 | 94 | 93 |

What we claim is:

1. A shape-memorizing block copolymer composition comprising a block copolymer component (I) composed of (A) at least two polymer segments (polymer segments A) having a glass transition temperature of 100° C. to 250° C. and (B) at least one amorphous polymer segment (polymer segment B) having a glass transition temperature of 0° C. to 60° C. which is lower than the lowest glass transition temperature within those of said polymer segments A with a difference of not less than 20° C., said polymer segment B being a copolymer of a conjugated diene monomer and an aromatic vinyl monomer, the proportion of said conjugated diene monomer and said aromatic vinyl monomer in said polymer segment B being in the range of (70/30) to (5/95) by weight, the proportion of whole of said polymer segments A to whole of said polymer segment B being in the range of (10/90) to (70/30) by weight; and a rubbery polymer component (II) having a glass transition temperature lower than −20° C., the proportion of said component (I) to said component (II) being in the range of (50/50) to (98/2) by weight.

EXAMPLES 5 TO 10 AND COMPARATIVE EXAMPLES 4

Each a sheet with dimensions of 10×25×1 (mm) was prepared using Polymer b indicated in Table 1 as the block copolymer component (I) and any of the following rubbery polymer components (II), ① polybutadiene rubber (BR; glass transition temperature −90° C., produced by Nippon Zeon K.K.), ② styrene-butadiene triblock copolymer (SBS-1; glass transition temperature −88° C., produced by Shell Chemical Co.: and SBS-2; glass 2. The shape-memorizing block copolymer composition described of claim 1, in which said rubbery polymer component (II) is a block copolymer composed of an aromatic vinyl compound and a conjugated diene compound.

3. The shape-memorizing block copolymer composition described in claim 1, in which each of said polymer segments A in said block copolymer component (I) is a homopolymer.

4. The shape-memorizing block copolymer composition described in claim 1, in which said polymer segments A in said block copolymer component (I) has a weight average molecular weight as a conversion to that of polystyrene in the range of 5,000 to 300,000.

5. The shape-memorizing block copolymer composition described in claim 1, in which said polymer segment B in said block copolymer component (I) has a weight average molecular weight as a conversion to that of polystyrene in the range of 10,000 to 300,000.

6. The shape-memorizing block copolymer composition described in claim 1, in which the proportion of said polymer segments A in said block copolymer component (I) to said polymer segment B is in the range of 20/80 to 50/50 by weight.

7. The shape-memorizing block copolymer composition described in claim 1, in which said block copolymer component (I) has a weight average molecular weight as a conversion to that of polystyrene in the range of 50,000 to 800,000.

8. The shape-memorizing block copolymer composition described in claim 1, in which the block copolymer in said block copolymer component (I) has either a structure represented by any of the general formulas $(A-B)_lA$, $(A-B)_m$ or $(A-B)_nX$, wherein A represents said polymer segment A, Bl represents said polymer segment B, represents an integer 1 to 5, m represents an integer 2 to 5, n represents an integer 2 to 10 and X represents a residual group of a coupling agent having 2 to 10 of the functionality, or a structure in which the main chain containing said polymer segments A and/or said polymer segment B has either a single number or a plural number of polymer chains having said polymer segments A or said polymer segment B branched from a plural number of the sites therein.

9. A method of using the shape-memorizing block copolymer composition described in claim 1, said method comprising the steps of molding the shape memorizing block copolymer composition at a temperature higher than the highest glass transition temperature within those of said polymer segments A in said block copolymer component (I) to memorize the shape at the time of shaping; deforming this shaped block copolymer composition at a temperature lower than the lowest glass transition temperature within those of said polymer segments A followed by fixing the deformation by cooling to a temperature below the lowest glass transition temperature within those of said polymer segment B in said block copolymer component (I); and restoring said shape memorized at the time of shaping by releasing the fixed deformation by heating said block copolymer composition with said fixed deformation to a requisite temperature lower than the lowest glass transition temperature within those of said polymer segments A in said block copolymer component (I) but exceeding the highest glass transition temperature within those of said polymer segment B in said block copolymer component (I).

10. A shape-memorizing molded article obtained by molding said shape-memorizing block copolymer composition described in claim 1 at a temperature above the highest glass transition temperature within those of said polymer segment A in said block copolymer component (I), deforming the molded block copolymer composition into any desired shape at a temperature below the lowest of the glass transition temperature of each polymer segment A of the block copolymer components (I), and cooling it to a temperature below the lowest of the glass transition temperature of each polymer segment B of the block copolymer components (I) to thereby fix the deformation.

* * * * *